United States Patent
Landers et al.

(10) Patent No.: US 11,144,071 B2
(45) Date of Patent: Oct. 12, 2021

(54) AVOIDANCE OF AIRCRAFT AND AIRCRAFT WAKE DURING FLIGHT

(71) Applicant: Gulfstream Aerospace Corporation, Savannah, GA (US)

(72) Inventors: Thomas Landers, Savannah, GA (US); Kevin Prosser, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 265 days.

(21) Appl. No.: 16/552,606

(22) Filed: Aug. 27, 2019

(65) Prior Publication Data

US 2020/0064866 A1     Feb. 27, 2020

Related U.S. Application Data

(60) Provisional application No. 62/723,224, filed on Aug. 27, 2018.

(51) Int. Cl.

| G05D 1/08 | (2006.01) |
|---|---|
| G05D 1/00 | (2006.01) |
| G05D 1/10 | (2006.01) |
| G06K 9/62 | (2006.01) |
| G08G 5/00 | (2006.01) |
| G08G 5/04 | (2006.01) |

(52) U.S. Cl.
CPC ......... *G05D 1/0816* (2013.01); *G05D 1/0061* (2013.01); *G05D 1/0088* (2013.01); *G05D 1/106* (2019.05); *G06K 9/6289* (2013.01); *G08G 5/006* (2013.01); *G08G 5/0039* (2013.01); *G08G 5/04* (2013.01)

(58) Field of Classification Search
CPC .... G05D 1/0816; G05D 1/0061; G05D 1/106; G05D 1/0088; G05D 1/1064; G08G 5/04; G08G 5/0039; G08G 5/006; G08G 5/0078; G08G 5/0091; G08G 5/045; G08G 5/0021; G06K 9/6289
See application file for complete search history.

(56) References Cited

U.S. PATENT DOCUMENTS

| | | | |
|---|---|---|---|
| 2002/0075171 A1* | 6/2002 | Kuntman | G01S 13/933 340/961 |
| 2002/0089432 A1 | 7/2002 | Staggs | |
| 2003/0222795 A1* | 12/2003 | Holforty | B64D 43/00 340/968 |
| 2010/0283635 A1 | 11/2010 | Brinkman et al. | |

(Continued)

*Primary Examiner* — Mary Cheung
(74) *Attorney, Agent, or Firm* — LKGlobal | Lorenz & Kopf, LLP

(57) ABSTRACT

Avionics systems, aircraft, and methods are provided. An avionics system for a subject aircraft includes an intruder aircraft detection device and a processor. The processor is programmed to: identify an intruder aircraft using the intruder aircraft detection device; predict a future path of the intruder aircraft; estimate strength, size, and location characteristics of a wake vortex created by the intruder aircraft at future points in time along the future path; calculate a potential trajectory with potential positions of the subject aircraft at each of the future points in time; compare the potential positions with the strength, size, and location characteristics of the wake vortex at each of the future points in time to identify a wake conflict; and maneuver the subject aircraft based on the wake conflict.

20 Claims, 3 Drawing Sheets

(56) References Cited

U.S. PATENT DOCUMENTS

2016/0328981 A1* 11/2016 Herder ................. G08G 5/0091
2017/0301251 A1* 10/2017 Robin .................. G08G 5/0008
2018/0301044 A1* 10/2018 Hiale-Guilhamou .......................
G05D 1/104

* cited by examiner

AVOIDANCE OF AIRCRAFT AND AIRCRAFT WAKE DURING FLIGHT

CROSS-REFERENCE TO RELATED APPLICATION

This application claims the benefit of U.S. provisional application No. 62/723,224, filed Aug. 27, 2018, titled AVOIDANCE OF AIRCRAFT AND AIRCRAFT WAKE DURING FLIGHT; the entire disclosure, drawings and appendices of which are incorporated herein by reference.

TECHNICAL FIELD

The present disclosure generally relates to avoiding aircraft wake turbulence vortices, and more particularly relates to aircraft systems that predict future wake turbulence vortices and evaluate the vortices as potential obstacles to flight.

BACKGROUND

This section provides background information related to the present disclosure which is not necessarily prior art.

Modern aircraft include a range of different protection systems, such as the terrain avoidance and warning system (TAWS). The TAWS is an example of an onboard protection system designed to detect and alert when the aircraft is within a predetermined proximity to static physical objects (e.g. to the ground, or a ground-mounted structure, such as a building or communication tower).

An aircraft will typically have several systems capable of assessing altitude, from which height above the ground can be calculated or inferred. The typical TAWS arrangement employs an on-board database system that correlates aircraft latitude-longitude (lat-lon) position to a stored ground elevation. A GPS system (or other navigation reference system) provides the aircraft's current lat-lon position, which is used to access the database to look up the ground elevation at the aircraft's position or in the aircraft's flight path. If the aircraft's flight path will take it too close to the ground (or a structure erected on the ground), the TAWS alerts the pilot and may also invoke other safety systems or autopilot systems that form part of the aircraft's protection system.

Another potential obstacle to flight is wake turbulence created by other aircraft in flight. Wake turbulence includes several components that disturb the air in the wake of the flying aircraft. Of the components, the wingtip vortices or wake vortices typically dissipate the slowest and remain hazardous to flight of other aircraft for the longest time after the wake generating aircraft is gone.

Wake vortices result from the forces that lift the aircraft. High pressure air from the lower surface of the wings flows around the wingtips to the lower pressure region above the wings. The movement of the higher pressure air to the lower pressure region generates a pair of counter-rotating vortices that are shed from the wings. As viewed from behind the aircraft, the right wing vortex rotates counterclockwise and the left wing vortex rotates clockwise. This region of rotating air behind the aircraft is where wake turbulence occurs. The strength of the vortex (e.g., rotational velocity and size) is generally determined by the configuration, weight, wingspan, and speed of the vortex generating aircraft.

Because these vortices exist behind the generating aircraft, conventional wake avoidance techniques rely on the pilot to consider where the generating aircraft has been in the past to know what areas may contain wake vortices, and attempt to avoid those areas. Although this reactive wake avoidance can work, it depends on the pilot being aware of where other aircraft are, and where their wake vortices are likely to travel.

Accordingly, there is room for improvement. Furthermore, other desirable features and characteristics of the present invention will become apparent from the subsequent detailed description and the appended claims, taken in conjunction with the accompanying drawings and the foregoing technical field and background.

SUMMARY

Avionics systems, aircraft, and methods are provided.

In one embodiment, an avionics system for a subject aircraft includes an intruder aircraft detection device and a processor. The processor is programmed to: identify an intruder aircraft using the intruder aircraft detection device; predict a future path of the intruder aircraft; estimate strength, size, and location characteristics of a wake vortex created by the intruder aircraft at future points in time along the future path; calculate a potential trajectory with potential positions of the subject aircraft at each of the future points in time; compare the potential positions with the strength, size, and location characteristics of the wake vortex at each of the future points in time to identify a wake conflict; and maneuver the subject aircraft based on the wake conflict.

In another embodiment, a subject aircraft includes an intruder aircraft detection device and a processor. The processor is programmed to: identify an intruder aircraft using the intruder aircraft detection device; predict a future path of the intruder aircraft; estimate strength, size, and location characteristics of a wake vortex created by the intruder aircraft at future points in time along the future path; calculate a potential trajectory with potential positions of the subject aircraft at each of the future points in time; compare the potential positions with the strength, size, and location characteristics of the wake vortex at each of the future points in time to identify a wake conflict; and maneuver the subject aircraft based on the wake conflict.

In yet another embodiment, a method of avoiding wake turbulence in a subject aircraft includes: identifying an intruder aircraft using the intruder aircraft detection device; predicting a future path of the intruder aircraft; estimating strength, size, and location characteristics of a wake vortex created by the intruder aircraft at future points in time along the future path; calculating a potential trajectory with potential positions of the subject aircraft at each of the future points in time; comparing the potential positions with the strength, size, and location characteristics of the wake vortex at each of the future points in time to identify a wake conflict; and maneuvering the subject aircraft based on the wake conflict.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

Figure 1:
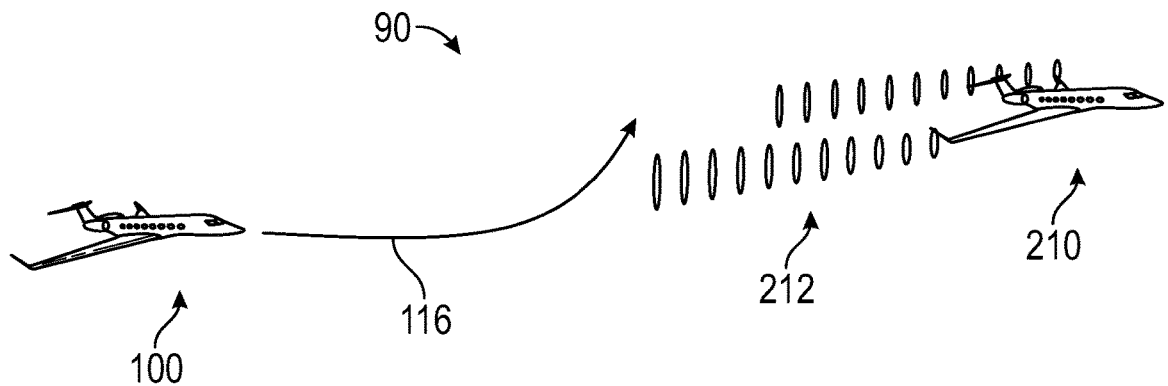
FIG. 1 is a schematic diagram illustrating an aircraft flying near a wake obstacle, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

In general, the embodiments described herein provide algorithms by which a subject aircraft may predict future conflicts with wake vortices that may or may not have already been generated by an intruder aircraft. The algorithms may predict a path and future location of the wake vortices generated by the intruder aircraft. By then modeling a potential path that the subject aircraft may fly, the algorithms may predict whether the potential path conflicts with the yet to be generated wake vortices. Predicting the conflict allows the subject aircraft to disfavor the potential path and favor a different potential path in which the turbulence experienced by the subject aircraft is reduced.

Example of System in which Wake Vortex Prediction May be Implemented

The disclosed wake vortex prediction system may be implemented as part of flight path predictive techniques to provide unified, full-envelope protection, working across the entire spectrum of aircraft flight conditions to address a full spectrum of different types of hazards. Flight path predictions are computed continuously from the aircraft's current situation using a kinematic energy model. Plural predicted trajectories are calculated, each representing a different escape route that will avoid a hazard when the threshold or trigger point for that hazard is reached. The system respects different types of hazards, some dealing with innate aircraft properties, such as speed and altitude limits, and some dealing with external concerns, such as terrain and object avoidance. The disclosed aircraft flight envelope protection system is designed to work across all such threat envelope boundaries.

Although plural trajectories are calculated, the envelope protection system continually assesses, and deprecates trajectories that are not feasible in the aircraft's current situation. A deprecated trajectory is treated by the system as not viable, unless the aircraft's situation changes such that the deprecated trajectory again becomes viable. The disclosed protection system works in the background, and does not override or usurp the pilot's authority until only one viable predicted trajectory remains (all other predicted trajectories have been deprecated), and a threat is triggered. In this event, the protection system automatically deploys an autopilot mechanism to take evasive action to avoid the hazard condition. The protection system may also generate warnings to the pilot, but is preferably not dependent on the pilot to take recovery action once the one remaining viable trajectory reaches the trigger point.

Preferably, the predictive envelope protection system is configured to provide a non-binary spectrum of recovery actions, including a passenger-safe, soft-ride recovery at one end of the spectrum and a hard recovery at the other end of the spectrum. When required to avert imminent threat, the system triggers a hard recovery. In less extreme situations where there is more time to recover, the system triggers a soft recovery—a passenger safe, smooth recovery. When such soft recovery is triggered the system will optionally blend input from the pilot into the recovery algorithm, allowing the pilot to modify the recovery aggressiveness based on the pilot's skill and experience.

Wake Vortex Future Condition Prediction

Referring now to FIG. 1, a scenario 90 with an example of a subject aircraft 100 is illustrated in accordance with some embodiments. Aircraft 100 is flying in proximity to an intruder aircraft 210 and wake vortices 212 generated by intruder aircraft 210. As used herein, the term "subject" is a name used only to differentiate aircraft 100 from intruder aircraft 210 for clarity of description, and implies no specific configuration in the claims other than the configuration recited therein. Although aircraft 100 is described in this description as an airplane, it should be appreciated that the systems described herein may be utilized in other aircraft, land vehicles, water vehicles, space vehicles, or other machinery without departing from the scope of the present disclosure. For example, the algorithms described herein may be applied to protect a vertical take-off and landing (VTOL) transport from the wake of a high speed train or to protect a fragile spacecraft from the high velocity exhaust of another spacecraft.

Figure 2:
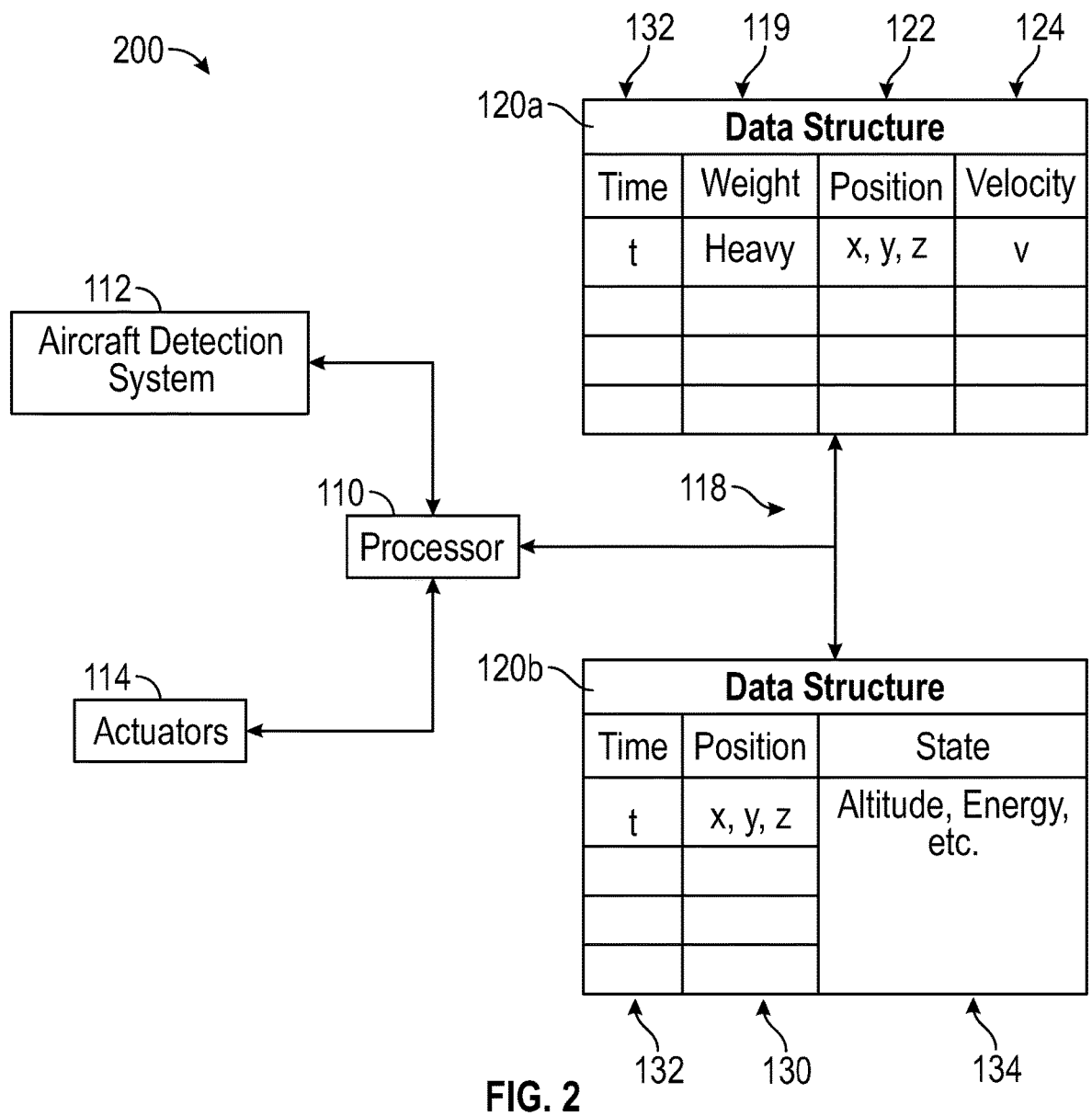
FIG. 2 is a simplified diagram illustrating an avionics system of the aircraft of FIG. 1.

Referring now to FIG. 2, and with continued reference to FIG. 1, an avionics and flight controls system 200 is illustrated in accordance with some embodiments. Avionics and flight controls system 200 is disposed on aircraft 100 and includes a processor 110, an aircraft detection system 112, and actuators 114. Processor 110 is programmed to operate aircraft 100 and to evaluate at least one potential trajectory 116, as will be described in further detail below. Processor 110 has an associated memory circuit 118 that is configured according to a predetermined threat data structure 120a that stores a plurality of different types of threats associated with aircraft 100. Although the format of data structure 120a is predetermined, the data stored in data structure 120a is dynamic. Data structure 120a includes all of the information needed to determine a size and position of wake vortex 212 at various points in time. In the example provided, data structure 120a stores a time value 132, an aircraft type or weight and wingspan 119, a position of intruder aircraft 210, and a velocity of intruder aircraft 210. The data structure may comprise a table, list, or matrix of records each corresponding to a different threat type. In the example provided, the threat type is the presence of a wake vortex obstacle.

The memory circuit 118 is also configured to support a trajectory coordinates data structure 120b that stores potential trajectories of subject aircraft 100 in terms of the space 130 and time 132 variables. For illustration purposes, the spacetime coordinate variables have been identified using a rectangular coordinate system (x, y, z, t). Other coordinate systems (e.g., spherical) may also be used.

At each point in time 132, data structure 120b also stores aircraft state 134 variables that correspond to the state of subject aircraft 100 at each future point in time listed as time variable 132. For example, aircraft state 134 variables may include aircraft altitude, specific energy, airspeed, pitch attitude, etc. In some embodiments, processor 110 may consider the state variables 134 to determine whether aircraft 100 can withstand flying through a portion of wake vortex 212 with an acceptable level of disturbance to aircraft 100. In some embodiments, wake vortex 212 is treated as a hard obstacle to be entirely avoided until an acceptable level of dissipation is predicted.

Aircraft detection system 112 includes one or more devices configured to detect intruder aircraft 210. In the example provided, aircraft detection system 112 includes an Aircraft Dependent Surveillance-Broadcast (ADS-B) radio and a Traffic Collision Avoidance System (TCAS) system. ADS-B and TCAS receive signals generated by intruder aircraft 210 indicating the presence of intruder aircraft 210. For example, aircraft detection system 112 may receive position and velocity data generated as an ADS-B transmission from intruder aircraft 210. Additionally or alternatively, aircraft detection system 112 may receive a transponder signal from a TCAS system onboard intruder aircraft 210. In some embodiments, aircraft detection system 112 includes LIDAR, RADAR, optical cameras, thermal cameras, ultrasonic sensors, and/or other sensors and other systems configured to detect intruder aircraft 210 even when intruder aircraft 210 is not generating an ADS-B or TCAS signal.

Actuator system 114 includes one or more actuator devices that control one or more vehicle features. For example, actuator system 114 may include actuators that manipulate control surfaces on aircraft 100, extend or retract landing gear of aircraft 100, an/or move other components of aircraft 100. Actuator system 114 may be used for autopilot control of subject aircraft 100.

Processor Configuration

In general, the algorithms described herein predict the motion path of the wake of the intruder aircraft. The wake moves in time so it is a four dimensional problem. In addition to predicting where in space the wake will be, the algorithms predict when in time the wake will be in that spot. Any segment of the wake has 5 characteristics: it has a width and a height that grows over time, an intensity that dissipates over time, and a lateral and vertical position that follows the wind and moves downward below the original path. There are two prongs to this prediction. The first is to propagate in time the wake that has already been created. The second prong is to predict the future path of the intruder aircraft so the wake that has not yet been created can be modeled.

Figure 3:
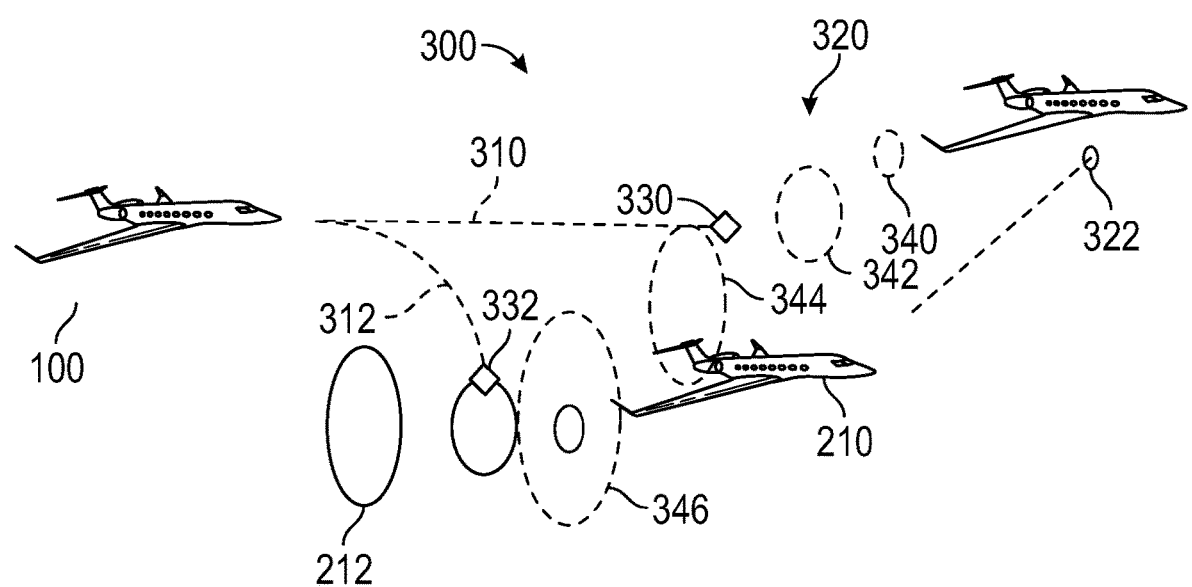
FIG. 3 is a schematic diagram illustrating the operation of the avionics system of FIG. 2, in accordance with various embodiments.
Figure 4:
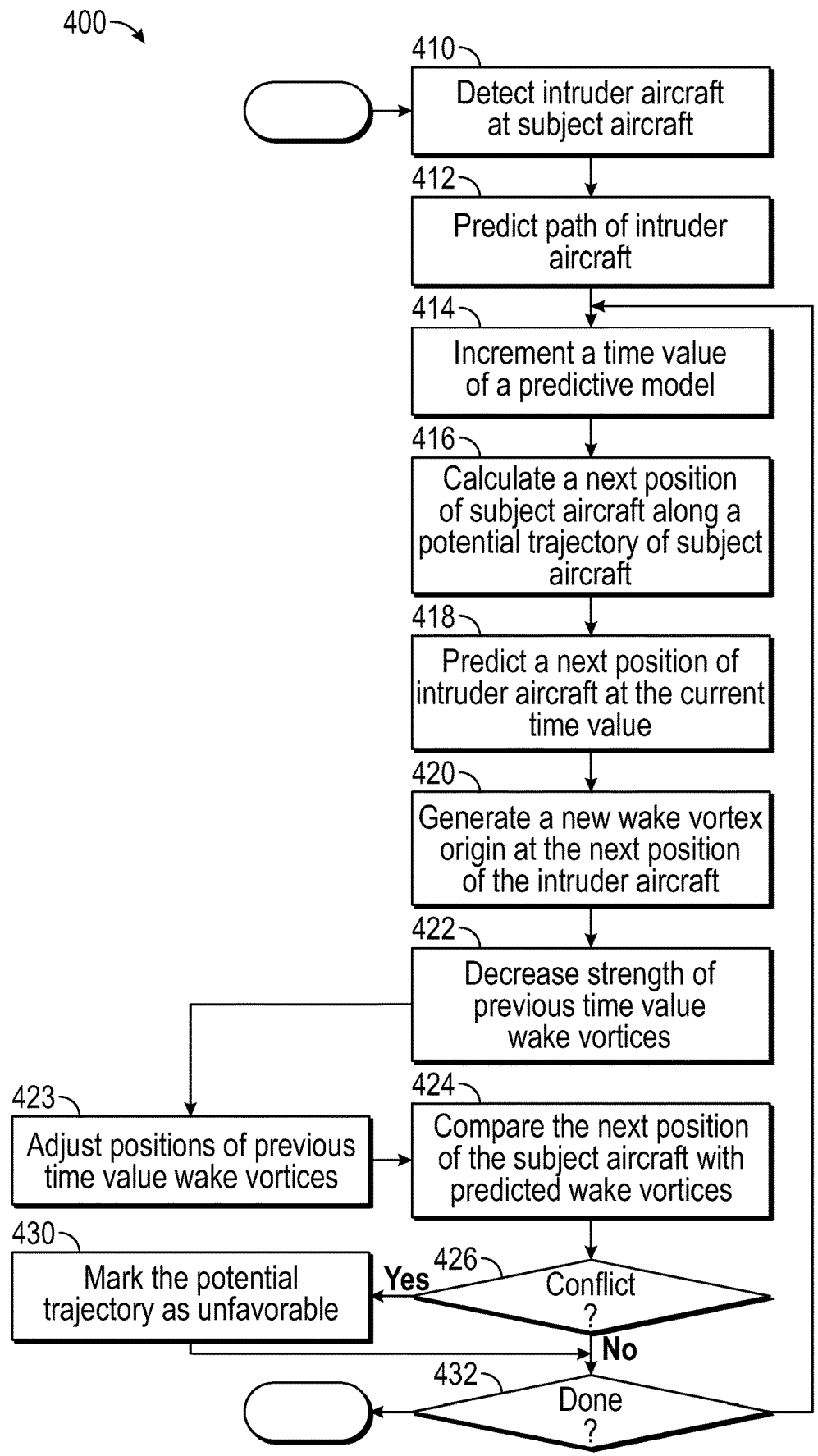
FIG. 4 is a flow diagram illustrating a method performed by the avionics system of FIG. 2, in accordance with various embodiments.

Referring now to FIGS. 3-4, and with continued reference to FIGS. 1-2, an operative scenario 300 is illustrated in which a method 400 is performed by processor 110. Processor 110 executes instructions and tasks to avoid intruder aircraft 210 and wake 212 of intruder aircraft 210. The instructions may include one or more separate programs, each of which comprises an ordered listing of executable instructions for implementing logical functions. The instructions, when executed by the processor, receive and process signals from the aircraft detection system, perform logic, calculations, methods and/or algorithms for automatically controlling the components of aircraft 100, and generate control signals for actuator system 114 to automatically control the components of aircraft 100 based on the logic, calculations, methods, and/or algorithms. Although only one processor 110 is illustrated, embodiments may include any number of processors 110 or subdivisions of processor 110 that communicate over any suitable communication medium or a combination of communication media and that cooperate to process sensor signals, perform logic, calculations, methods, and/or algorithms, and generate control signals to automatically control features of aircraft 100. In various embodiments, one or more instructions, when executed by the processor, models possible recoveries of the aircraft and tests those recoveries for conflicts with predicted positions of wake vortex 212.

As used herein, the term "intruder aircraft" means any aircraft within a predetermined range. The range may be expressed as a physical distance, a communications range of an Aircraft Dependent Surveillance-Broadcast (ADS-B) signal, a range associated with a Traffic Collision Avoidance System (TCAS) system, a visual range associated with an optical camera, or any other suitable range for detecting an aircraft that may become an obstacle or whose wake vortex may become an obstacle.

Processor 110 evaluates a first potential trajectory 310 and a second potential trajectory 312 for conflicts with a predicted wake vortex 320 generated by intruder aircraft 210 at a predicted position 322, as illustrated in FIG. 3. In the example illustrated, processor 110 is evaluating potential trajectories 310 and 312 at a specific time t in which subject aircraft 100 is predicted to be at position 330 along first potential trajectory 310 and to be at position 332 along second potential trajectory 312. At time t processor 110 predicts intruder aircraft 210 will be at predicted position 322 and predicted wake vortex 320 will have a newly estimated portion 340 and multiple previously estimated wake vortex portions 342, 344, and 346, as will be described below.

In the example provided, processor 110 performs tasks associated with method 400. For example, processor 110 determines a likely magnitude and location of wake vortices, applying compensation for local wind and predicting future location of vortices and intruder aircraft. In some embodiments, processor 110 considers a 4-dimensional wake vortex time-location as well as an aircraft 4-D time-location as an obstacle to avoid. For example, intruder aircraft 210 and wake 320 may be treated the same as terrain or other obstacles to be avoided during flight for avoidance actions.

Processor 110 identifies an intruder aircraft 210 at task 410. In the example provided, processor 110 identifies intruder aircraft 210 using intruder aircraft detection system 112. For example, the intruder aircraft detection device may be a cooperative avoidance communication system configured to receive path intent data from the intruder aircraft. The cooperative avoidance communication system may utilize Traffic Collision Avoidance System (TCAS), Aircraft Dependent Surveillance-Broadcast (ADS-B), or other systems that provide intruder aircraft position. In some embodiments, the information obtained includes type, speed, and track of intruder aircraft 210.

Processor 110 predicts a future path of the intruder aircraft 210 at task 412. For example, processor 110 may use a current speed and a current position of intruder aircraft 210 to predict where intruder aircraft 210 will go in the future. In some embodiments, processor 110 is programmed to predict the future path of the intruder aircraft based on the path intent data from the cooperative avoidance communication system.

Processor 110 increments a time value of a predictive model in task 414. For example, processor 110 may advance a time value to time t for calculation of position and aircraft state variables that may exist at time t. Processor 110 calculates a potential trajectory with potential positions of the subject aircraft at each of the future points in time in task 418. For example, processor 110 may calculate that subject aircraft 100 will be at future position 330 at time t when following potential trajectory 310 and/or may calculate that subject aircraft 100 will be at future position 332 at time t when following potential trajectory 312.

Processor 110 predicts a next position of intruder aircraft 210 at task 418. For example, processor 110 may use a current speed and a current position of intruder aircraft 210 to predict that intruder aircraft 210 will be at predicted position 322 at time t.

Processor 110 generates a newly estimated portion of the wake vortex at the intruder aircraft at the current time value along the future path at task 420. In combination with task 414, task 420 causes processor to generate newly estimated portions at each of the future points in time as the time value increments. For example, the size, strength, and location of a wake vortex portion 340 created by intruder aircraft 210 having weight and speed characteristics of intruder aircraft 210 may be retrieved by a table lookup of known wake vortex strengths that have been previously determined.

Previous time value wake vortex portions are increased in size and decreased in strength at task 422. For example, the "newly estimated portion" calculated at t-1 may be increased in size and decreased in strength by predetermined dissipation rates to result in wake vortex portion 342. Similarly, the "newly estimated portion" calculated at t-2 may be increased in size and decreased in strength to result in wake vortex portion 344 and the "newly estimated portion" calculated at t-3 may be increased in size and decreased in strength to result in wake vortex portion 346. In the example provided, wake vortex portions 340, 342, 344, and 346 are stored in obstacle data structure 120a to define positions associated with each of the future points in time in the obstacle data structure.

Alternative methods of adjusting the wake vortex 320 with time may be utilized without departing from the scope of the present disclosure. For example, processor 110 may calculate a predicted shape of wake vortex 320 and move the predicted shape within a terrain database based on the velocity of intruder aircraft 210 to predict the position of wake vortex 320.

Processor 110 is programmed to at least partially estimate location characteristics of the wake vortex by adjusting a position of a previously estimated portion of the wake vortex based on a wind vector at task 423. For example, processor 110 may move each of wake vortex portions 342, 344, and 346 by an amount corresponding to a measured wind vector. The wind vector may be obtained by sensors onboard subject aircraft 100, obtained by weather data retrieved from weather services, or obtained by other suitable methods.

Processor 110 compares the potential positions with the strength, size, and location characteristics of the wake vortex at each of the future points in time to identify a wake conflict at task 424. For example, processor 110 may determine that there is no wake conflict at position 332 if subject aircraft 100 follows potential trajectory 312 because the currently existing wake vortex 212 has dissipated and future wake vortex 320 does not extend to (i.e., will have dissipated at time t) at position 332. Conversely, currently existing wake vortex 212 did not exist at position 330, but will be identified as a wake vortex conflict because position 330 exists between future wake vortex portions 342 and 344.

Task 426 sends method 400 to task 430 if a conflict exists or to task 432 if no conflict exists. Processor 110 deprecates or marks as unfavorable the potential trajectories that have a conflict at task 430. For example, processor 110 may mark potential trajectory 310 as unfavorable while not marking potential trajectory 312 as unfavorable.

Processor 110 determines whether the potential trajectory currently being calculated is done being calculated at task 432. For example, potential trajectory may be calculated a predetermined distance or a predetermined time away from the current position and time of subject aircraft 100.

In the example provided, processor 110 is further programmed to maneuver the subject aircraft based on the wake conflict at least partially by flying the subject aircraft in response to marking the potential trajectory as unfavorable when the potential trajectory is a last trajectory of a plurality of potential trajectories to be marked unfavorable. In some embodiments, the avoidance is a speed change, turn, climb, descent, or combination thereof. In some embodiments, the avoidance is determined by the trajectories predicted by a trajectory prediction algorithm.

Conclusion

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An avionics system for a subject aircraft, the avionics system comprising:
an intruder aircraft detection device; and
a processor programmed to:
identify an intruder aircraft using the intruder aircraft detection device;
predict a future path of the intruder aircraft;
estimate strength, size, and location characteristics of a wake vortex created by the intruder aircraft at past, present, and future points in time along the intruder aircraft's past, present, and future path;
calculate a potential trajectory with potential positions of the subject aircraft at each of the past, present, and future points in time;
compare the potential positions with the strength, size, and location characteristics of the wake vortex at each of the past, present, and future points in time to identify a wake conflict; and
maneuver the subject aircraft based on the wake conflict.

2. The avionics system of claim 1, wherein the processor is programmed to at least partially estimate the strength, size, and location characteristics of the wake vortex by generating a newly estimated portion of the wake vortex at the intruder aircraft at each of the points in time along the intruder aircraft's past, present, and future path.

3. The avionics system of claim 2, wherein the processor is programmed to at least partially estimate the strength, size, and location characteristics of the wake vortex by increasing a size and decreasing a strength of a previously estimated portion of the wake vortex, and adjusting the position of the wake vortex based on its predicted trajectory.

4. The avionics system of claim 1, wherein the intruder aircraft detection device is a cooperative avoidance communication system configured to receive path intent data from the intruder aircraft, and wherein the processor is configured to predict the future path of the intruder aircraft based on the path intent data.

5. The avionics system of claim 1, wherein the processor is further programmed to mark the potential trajectory as an unfavorable trajectory in response to identifying the wake conflict.

6. The avionics system of claim 5, wherein the processor is further programmed to maneuver the subject aircraft based on the wake conflict at least partially by flying the subject aircraft in response to marking the potential trajectory as unfavorable when the potential trajectory is a last trajectory of a plurality of potential trajectories to be marked unfavorable.

7. The avionics system of claim 1, wherein the processor is programmed to at least partially estimate location characteristics of the wake vortex by adjusting a position of a previously estimated portion of the wake vortex based on a wind vector.

8. The avionics system of claim 1, further comprising an obstacle data structure defining locations of potential obstacles to the subject aircraft, and wherein the processor is further programmed to store the strength, size, and location characteristics of the wake vortex as positions associated with each of the past, present, and future points in time in the obstacle data structure.

9. A subject vehicle, comprising:
an intruder vehicle detection device; and
a processor programmed to:
identify an intruder vehicle using the intruder vehicle detection device;
predict a past, present, and future path of the intruder vehicle;
estimate strength, size, and location characteristics of a wake vortex created by the intruder vehicle at points in time along the past, present, and future path;
calculate a potential trajectory with potential positions of the subject vehicle at each of the past, present, and future points in time;
compare the potential positions with the strength, size, and location characteristics of the wake vortex at each of the past, present, and future points in time to identify a wake conflict; and
maneuver the subject vehicle based on the wake conflict.

10. The subject vehicle of claim 9, wherein the processor is programmed to at least partially estimate the strength, size, and location characteristics of the wake vortex by generating a newly estimated portion of the wake vortex at the intruder vehicle at each of the points in time along the past, present, and future path of the intruder.

11. The subject vehicle of claim 10, wherein the processor is programmed to at least partially estimate the strength, size, and location characteristics of the wake vortex by increasing a size and decreasing a strength of a previously estimated portion of the wake vortex.

12. The subject vehicle of claim 9, wherein the intruder vehicle detection device is a cooperative avoidance communication system configured to receive path intent data from the intruder vehicle, and wherein the processor is configured to predict the past, present, and future path of the intruder vehicle based on the path intent data.

13. The subject vehicle of claim 9, wherein the processor is further programmed to mark the potential trajectory as an unfavorable trajectory in response to identifying the wake conflict.

14. The subject vehicle of claim 13, wherein the processor is further programmed to maneuver the subject vehicle based on the wake conflict at least partially by flying the subject vehicle in response to marking the potential trajectory as unfavorable when the potential trajectory is a last trajectory of a plurality of potential trajectories to be marked unfavorable.

15. The subject vehicle of claim 9, wherein the processor is programmed to at least partially estimate location characteristics of the wake vortex by adjusting a position of a previously estimated portion of the wake vortex based on a wind vector.

16. The subject vehicle of claim 9, further comprising an obstacle data structure defining locations of potential obstacles to the subject vehicle, and wherein the processor is further programmed to store the strength, size, and location characteristics of the wake vortex as positions associated with each of the past, present, and future points in time in the obstacle data structure.

17. A method of avoiding wake turbulence in a subject aircraft, the method comprising:
identifying an intruder aircraft using the intruder aircraft detection device;
predicting a future path of the intruder aircraft;
estimating strength, size, and location characteristics of a wake vortex created by the intruder aircraft at future points in time along the past, present, and future path;
calculating a potential trajectory with potential positions of the subject aircraft at each of the past, present, and future points in time;
comparing the potential positions with the strength, size, and location characteristics of the wake vortex at each of the past, present, and future points in time to identify a wake conflict; and
maneuvering the subject aircraft based on the wake conflict.

18. The method of claim 17, further comprising at least partially estimating the strength, size, and location characteristics of the wake vortex by generating a newly estimated portion of the wake vortex at the intruder aircraft at each of the past, present, and future points in time along the past, present, and future path.

19. The method of claim 18, further comprising at least partially estimating the strength, size, and location characteristics of the wake vortex by increasing a size and decreasing a strength of a previously estimated portion of the wake vortex.

20. The method of claim 17, wherein the intruder aircraft detection device is a cooperative avoidance communication system configured to receive path intent data from the intruder aircraft, and wherein the processor is configured to predict the past, present, and future path of the intruder aircraft based on the path intent data.

* * * * *